United States Patent Office 3,205,621
Patented Sept. 14, 1965

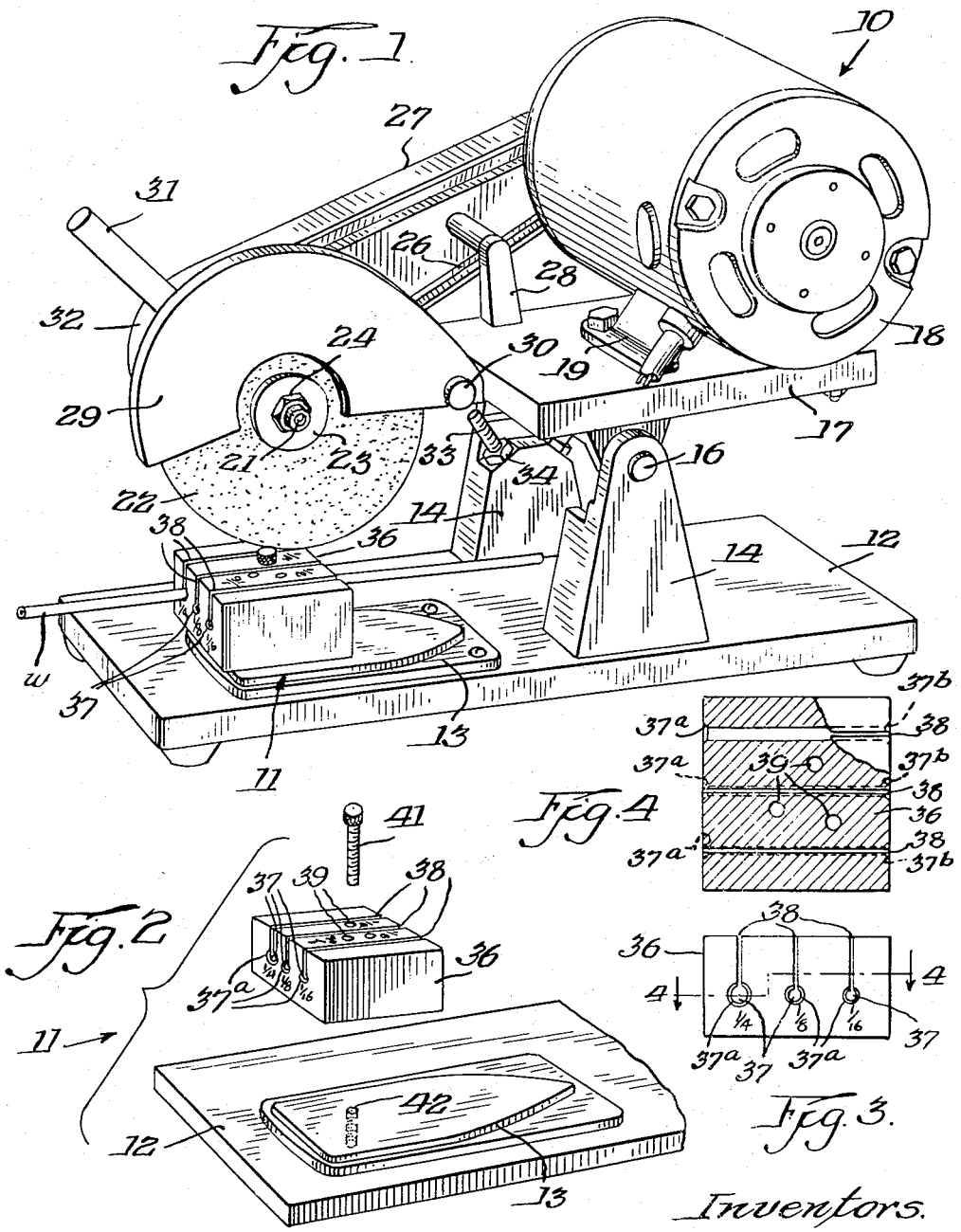

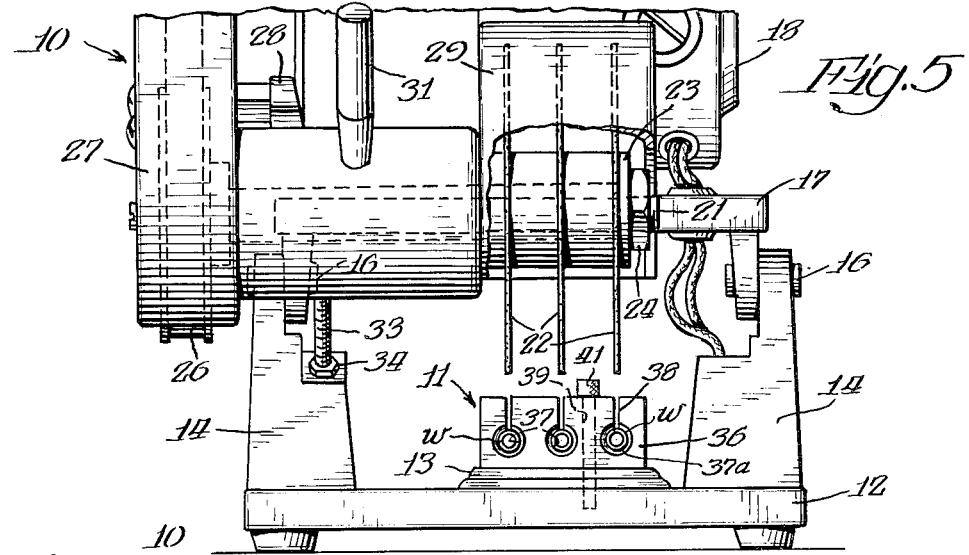

3,205,621
PORTABLE SAW INCLUDING WORK HOLDER
Bayard C. Davis, 272 Illinois St., Elmhurst, Ill., and
Alvin Singer, 4646 Laurel Ave., Glenview, Ill.
Filed Aug. 20, 1963, Ser. No. 303,389
5 Claims. (Cl. 51—98)

This invention relates to portable saw units and more particularly to an improved work holder for use in conjunction with a portable saw unit.

It is an object of this invention to provide an improved portable saw unit including a work holder for effecting slitting, grooving, and related operations on a piece of material positioned in the work holder.

Another object of the invention is to provide a work holder for use with a portable saw unit, which work holder readily facilitates accurately effecting a variety of complex cutting operations on relatively small specimens.

A further object of the present invention is to provide an improved work holder for use in a portable saw unit which is relatively low cost and simple in construction.

Other objects and advantages of the present invention will become apparent from the following detailed description when considered in conjunction with the accompanying drawing wherein:

FIGURE 1 is a persepctive view of an improved portable saw unit adapted with a work holder embodying the features of the present invention;

FIGURE 2 is a fragmentary exploded view of a portion of the portable saw unit which illustrates the work holder in greater detail;

FIGURE 3 is a front elevation of the work holder shown in FIGURES 1 and 2;

FIGURE 4 is a cross-sectional view taken along line 4—4 in FIGURE 3;

FIGURE 5 is a fragmentary front elevational view of the portable saw unit as depicted in FIGURE 1 when adapted with a plurality of cutting blades for carrying out a number of simultaneous cutting operations;

FIGURE 6 is still another fragmentary front elevational view of the portable saw unit depicted in FIGURE 1 when adapted with a selectively positionable work holder that accommodates a plurality of similar work pieces;

FIGURE 7 is a fragmentary side elevational view depicting the indexing means for the selectively positionable work holder as shown in FIGURE 6; and FIGURE 8 is a fragmentary plan view taken along the line 8—8 in FIGURE 7 and further illustrating the indexing means for the selectively positionable work holder of FIGURE 6.

In general, the present invention relates to an improved portable saw unit including a work holder for effecting a variety of cutting, slitting, and grooving operations with a minimum of time-consuming effort. The work holder is constructed so as to receive a number of differently sized work pieces (including relatively small specimens) and to facilitate the performance of the aforedescribed operations with a high degree of accuracy within close tolerances. The work holder itself is readily adaptable for use on the portable saw unit in any one of a number of predetermined positions in accordance with the size of the work piece and is relatively simple and low cost in construction.

Referring to the drawing, there is disclosed a portable saw unit which includes a pivotal base structure whereon a rotary saw blade and a motor for driving the blade are mounted in cooperative relationship. The work holder is mounted on the portable saw unit in the path of pivotal movement of the blade. The work holder includes a main body portion and suitable means for securing the main body portion to the portable saw unit in one of several predetermined positions lying in the path of pivotal blade movement. The main body portion of the work holder is provided with a plurality of differently sized work accommodating apertures which extend through the main body portion. A plurality of blade receiving slots extend between one surface of the main body portion and communicate with each of the apertures. Each of the slots is proportioned to receive the driven blade in response to a controlled pivotal advance of the driven rotating blade. This pivoting advances the blade a preselected distance into the aperture aligned with the blade so that the blade engages a work piece positioned within the aperture. After the blade is advanced into cutting engagement with a work piece, the work piece is selectively advanced through the aperture and relative to the driven blade whereby a desired cutting, slitting or grooving operation is carried out.

FIGURE 1 specifically illustrates a portable saw unit 10 provided with an improved work holder 11 in accordance with the present invention. As shown, the portable saw unit 10, which is itself preferably a unit of small size (i.e. weighing less than 15 lbs.), includes a stationary base frame 12 whereon a work table 13 is mounted for supporting the work holder 11, as hereinafter described. A pair of mounting pedestals 14 is secured and extends upwardly from the base frame 12. The mounting pedestals are secured to the frame in spaced apart relation to each other and are positioned rearwardly of the work table 13.

Suitable mounting pins 16 extend through upper apertured portions of the mounting pedestals 14 and function to pivotally secure a support plate 17 to the pedestal. The plate 17 preferably has a generally L-shaped configuration. In this connection, the rearward enlarged portion of the pivotal plate 17 serves as the support for a conventional electric drive motor 18, the weight of which normally maintains the plate in the position shown in FIG. 1. The motor 18 is secured to the support plate 17 by a suitable motor mounting 19. A forward reduced portion of the plate 117 (not shown) extends from the motor mounting portion (i.e. from right to left in FIG. 1) and serves to support an arbor shaft 21 which is selectively driven through a belt and pulley arrangement by the motor 18.

As shown, a circular saw blade 22, which may be formed of any suitable abrasive material, is mounted on the outwardly extending end of the arbor shaft 21. The blade 22 is held on the shaft 21 by a blade retaining member 23 and is removably secured to the shaft by a conventional nut or similar locking element 24. The other end of the arbor shaft is connected in a conventional manner to a suitable pulley (not shown). This pulley and a second pulley secured to the driven shaft of the motor 18 are linked through a belt 26 so that the selective operation of the motor 18 (e.g. in response to a switch actuation) drives the belt 26 thereby imparting rotary motion to the saw blade 22.

As shown, the belt 26 and the associated pulleys are confined within a generally V-shaped belt housing 27 that is detachably secured to the pivot base 17 by a suitable mounting support 28. The upper half of the saw blade 22 is also confined within a protective covering 29 that is secured by a locking screw 30 to the base 17. The protective cover 29 is mounted on the pivot base 17 so that it can be swung upwardly and away from the blade 22 when it is desired to replace the blade.

As described above, the structural arrangement of the motor and blade and the various elements associated therewith is such that the entire arrangement is pivotally mounted on the pedestals 14 for movement relative to the frame 12. To facilitate the selected pivotal movement of the saw blade, a handle 31 is secured to and extends outwardly from a suitable enclosure or housing 32 which surrounds the arbor shaft and the portion of the L-shaped pivot base to which it is secured. When the handle 31 is grasped and a downward force is imparted thereto, counter-clockwise pivotal movement is imparted to the portable saw unit including the driven saw blade and the driving motor. This force need only be sufficient to overcome the weight of the motor 18 that normally maintains the portable saw assembly in spaced vertical relation to the work holder 11.

It is obvious that the pivotal movement of the driven saw blade 22 to a predetermined position relative to a work piece confined within the holder 11, as hereinafter described in detail, must be accurately controlled so that the desired depth of the cutting, slitting or grooving operation is accurately controlled. To achieve this, a calibrated stop element 33 is mounted on one of the pedestals 14 and is provided with a knurled adjusting knob 34. The stop element 33, in response to manual rotary motion being imparted to the knob 34, is selectively positioned to accurately control and limit the pivotal advance of the portable saw unit 10. The downward pivotal advance of the blade 22 into the desired position relative to the work holder is dictated and indicated by finely calibrated markings on the stop element 33.

As generally outlined above, the work holder 11 is designed to receive a variety of work pieces, one of which is designated by the letter "$w$" in FIGURE 1, so that a variety of cutting, slitting, grooving operations, and the like can be readily effected by the unit 10. To this end, a preferred embodiment of the work holder 11 includes a main body portion 36 which has a configuration corresponding substantially to a rectangular parallelepiped. The main body portion 36 is provided with a plurality of suitably shaped but dissimilarly sized elongated work piece accommodating apertures 37. The apertures 37, which have a cylindrical configuration in the illustrated embodiment, extend in parallel spaced apart relation through the main body portion 36. Preferably, the opposite extremities of each of the apertures 37 have widened mouth portions 37a and 37b that facilitate the positioning of work pieces within the aperture. One each of a plurality of blade receiving slots 38 extends from the upper surface of the work holder and communicates with a corresponding one of the apertures 37 along the entire length of the aperture.

As shown particulary in FIGURE 4, a plurality of cylindrical mounting holes 39 extend through the main body portion 36 in a direction normal to that of the work piece receiving apertures 37 and the blade receiving slots 38 associated therewith. The mounting holes 39 are each designated and selectively positioned in the main body portion 36 to correspond to one of the apertures 37 and to accommodate the selective positioning of one of the apertures in alignment with the saw blade 22.

More particularly, a mounting bolt 41 is provided for the work holder 11 so that the work holder can be removably secured in any one of several positions relative to the work table 13. To effect this positioning, the mounting bolt 41 is passed through the desired mounting hole 39 and is then threaded through a suitable threaded receiving aperture 42 provided in the work table 13. If, for example, a desired cutting, slitting, or grooving operation is carried out on a work piece "$w$" having a diameter of one-sixteenth inch ($\frac{1}{16}''$), the bolt 41 is positioned in the appropriately designated hole 39 (i.e. that designated $\frac{1}{16}''$) and threaded into the aperture 42. With this operation completed, the one-sixteenth inch ($\frac{1}{16}''$) work piece receiving aperture 37 and, more importantly, the blade receiving slot 38 that communicates with this aperture is then positioned in direct alignment with the saw blade 22. After a work piece "$w$" is positioned within this aperture, a desired cutting, slitting, or grooving operation is carried out by merely rendering the drive motor effective, advancing the blade into the blade receiving slot 37 and advancing the work piece "$w$" through the aperture and relative to the rotating blade 22.

The portable saw assembly and associated work holder 11 facilitates effecting a variety of different operations on suitably proportioned work pieces which would otherwise be extremely difficult to achieve. In this connection, work pieces "$w$" which are solid cylindrical members, hollow tubes, and the like formed of various metallic and ceramic materials can be subjected to a variety of operations through the use of the combined portable saw and work holder unit.

One typical example of an otherwise difficult and time consuming operation which is effected quite accurately and easily with the apparatus of the present invention is the slitting of a tubular work piece of any suitable length and of a relatively small diameter, e.g., $\frac{1}{16}''$. Such a slitting operation is carried out as generally described above by positioning the work piece within the appropriate work piece receiving aperture 37 and thereafter bringing the driven saw blade 22 into contact with the peripheral surface of the work piece to initiate the slitting operation. Once the slitting operation has been initiated, the work piece is advanced through the aperture and relative to the blade to complete the slitting thereof. Similarly, grooves of desired depth can be formed in ceramic materials by employing the device, and the accuracy of the depth of such grooves is assured.

It should be understood that the foregoing is merely illustrative of the invention. Various modifications in the work holder (e.g. variations in the mounting arrangement configuration, dimensions, etc.) can be devised by those skilled in the art without departing from the communicating slot-aperture arrangement which facilitates the use of the work holder with a portable saw unit which is itself of a small and compact size.

For example, the saw structure can be readily modified so that a number of blades 22 are mounted in suitably spaced parallel relation on the shaft 21 and are concomitantly driven so that a number of desired cutting, slitting or grooving operations can be simultaneously effected. In such an instance (i.e. see FIGURE 5), the work holder 11 preferably accommodates a corresponding number of work pieces, and the holder is positioned so that the work pieces confined within the holder are aligned with and engageable by the simultaneously driven blades. Alternatively, the work holder can be constructed to accommodate a plurality of similarly sized work pieces on which identical cutting operations are to be performed. Under these circumstances (i.e. see FIGURES 6–8), the holder 11 is movably mounted on the work table 13 so that the holder can be selectively indexed transversely of the path of pivotal movement of the blade 22 whereby successive and idential cutting operations can be carried out in a rapid and efficient manner.

These and other similar modifications of the disclosed portable saw-work holder arrangement would not constitute a variation from the invention as set forth in the following claims.

What is claimed is:
1. A portable saw unit for effecting selective cutting operations on a work piece in response to the movement of said work piece relative to a work piece holder and subsequent to the controlled advancement of a cutting element of said saw unit into communication with said work piece holder, which saw unit comprises a support frame, a mounting structure pivotally mounted on said support frame, a saw blade secured to said mounting structure for pivotal movement therewith and rotary movement relative thereto, a driving motor secured to said mounting structure for pivotal movement therewith, means drivingly connecting said blade to said motor so that selective rotary motion is imparted to said blade by said motor, a work holder mounted on said support frame in the path of pivotal movement of said driven blade, said work holder including a main body portion and means for securing said main body portion to said saw unit in the path of pivotal movement of said blade, said main body portion including at least one elongated work accommodating aperture extending therethrough and a blade receiving slot extending from one surface of said main body portion and communicating with said aperture along the entire length thereof, said aperture being proportioned to receive said blade so that upon pivotal movement of said base structure said blade is advanced through said slot and a preselected distance into said work accommodating aperture so as to be engageable with a work piece positioned therein.

2. In a portable saw unit including a pivotal base structure whereon a rotary saw blade and a motor for driving the blade are mounted in cooperative relationship, a work holder adapted to be mounted on said portable saw unit in the path of pivotal movement of the blade, said work holder comprising a main body portion and means for securing said main body portion to said portable saw unit in the path of pivotal movement of said blade, said main body portion including at least one elongated work accommodating aperture extending therethrough and a blade receiving slot extending from one surface of said main body portion and communicating with said aperture along the entire length thereof, said aperture being proportioned to receive said blade so that upon pivotal movement of said base structure said blade is advanced through said slot and a preselected distance into said work accommodating aperture so as to be engageable with a work piece positioned therein.

3. A work holder for use with a portable saw unit including a pivotal base structure whereon a rotary saw blade and a motor for driving said blade are mounted in cooperative relationship; which work holder comprises a main body portion adapted to be mounted on said saw unit in the path of pivotal movement of said blade, said main body portion including a plurality of spaced apart elongated work piece accommodating apertures and a plurality of blade receiving slots, one each of said blade receiving slots communicating with one of said apertures along the entire length thereof, each of said slots being proportioned to receive said blade when aligned therewith so that upon pivotal movement of said base structure said blade can be advanced through said slot and a preselected distance into engagement with a work piece positioned within the aperture with which said slot communicates; and means engageable with said main body portion for positioning said work holder in one of several predetermined positions so as to align a selected one of said communicating slots and apertures with said blade.

4. In a portable saw unit including a pivotal base structure whereon a rotary saw blade and a motor for driving the blade are mounted in cooperative relationship, a work holder adapted to be mounted on said portable saw unit in the path of pivotal movement of the blade; which work holder comprises a main body portion having a plurality of elongated work piece accommodating apertures formed therein and extending therethrough, said apertures extending through a central region of said main body portion in parallel spaced apart relation to each other and having flared extremities to facilitate the introduction of a work piece to said apertures, said main body portion also having a plurality of blade receiving slots, one each of said blade receiving slots extending from one surface of said main body portion and communicating with each of said apertures along the entire length thereof, said communicating slots and apertures being proportioned to receive said blade when aligned therewith so that upon pivotal movement of said base structure said blade is advanced through said slot and a preselected distance into said work accommodating aperture aligned therewith so as to be engageable with a work piece positioned therein; and means cooperable with said main body portion for selectively positioning said holder in one of several predetermined positions and thereby align one of said communicating slots and apertures with said blade.

5. A work holder for use with a portable saw unit including a pivotal base structure whereon a rotary saw blade and a motor for driving said blade are mounted in cooperative relationship; which work holder comprises a main body portion having a plurality of elongated work piece accommodating apertures extending through a central region of said main body portion in parallel spaced apart relation to each other and having flared extremities to facilitate the introduction of the work piece to said apertures, said main body portion also having a plurality of blade receiving slots, one each of said blade receiving slots extending from one surface of said main body portion and communicating with each of said apertures along the entire length thereof, said communicating slots and apertures being proportioned to receive said blade when aligned therewith so that upon pivotal movement of said base structure said blade is advanced through said slot and a preselected distance into said work accommodating aperture aligned therewith so as to be enageable with a work piece positioned therein; and means cooperable with said main body portion for selectively positioning said holder in one of several predetermined positions and thereby align one of said communicating slots and apertures with said blade.

References Cited by the Examiner
UNITED STATES PATENTS

| | | | |
|---|---|---|---|
| 1,979,140 | 10/34 | Casey | 51—98 |
| 2,435,156 | 1/48 | Pealer | 51—98 |
| 3,101,574 | 8/63 | West | 51—92 |

LESTER M. SWINGLE, *Primary Examiner.*